United States Patent
Kamhi et al.

(10) Patent No.: US 9,975,241 B2
(45) Date of Patent: May 22, 2018

(54) MACHINE OBJECT DETERMINATION BASED ON HUMAN INTERACTION

(71) Applicant: Intel Corporation, Santa Clara, CA (US)

(72) Inventors: Gila Kamhi, Zichron Yaakov (IL); Amit Moran, Tel Aviv (IL); Kobi Nistel, Haifa (IL); David Chettrit, Zurich (CH)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/958,440

(22) Filed: Dec. 3, 2015

(65) Prior Publication Data
US 2017/0157766 A1    Jun. 8, 2017

(51) Int. Cl.
*B25J 9/00* (2006.01)
*B25J 9/16* (2006.01)

(52) U.S. Cl.
CPC .............. *B25J 9/161* (2013.01); *B25J 9/1661* (2013.01)

(58) Field of Classification Search
USPC .......... 700/245–264; 318/567–569; 382/153; 706/12; 901/1–3, 46, 47
See application file for complete search history.

(56) References Cited

U.S. PATENT DOCUMENTS

| | | | | |
|---|---|---|---|---|
| 5,250,886 A | * | 10/1993 | Yasuhara | G05B 19/425 318/567 |
| 6,310,964 B1 | * | 10/2001 | Mohan | G01B 11/024 348/89 |
| 6,516,099 B1 | * | 2/2003 | Davison | G06T 7/33 345/419 |

(Continued)

FOREIGN PATENT DOCUMENTS

| | | |
|---|---|---|
| JP | 2004-268148 A | 9/2004 |
| JP | 2008-068348 A | 3/2008 |
| JP | 2010-064154 A | 3/2010 |

OTHER PUBLICATIONS

International Search Report and Written Opinion issued in PCT Application No. PCT/US2016/059820, dated Feb. 15, 2017, 11 pages.

*Primary Examiner* — Jonathan L Sample
(74) *Attorney, Agent, or Firm* — Grossman, Tucker, Perreault & Pfleger, PLLC (57) ABSTRACT

This disclosure pertains to machine object determination based on human interaction. In general, a device such as a robot may be capable of interacting with a person (e.g., user) to select an object. The user may identify the target object for the device, which may determine whether the target object is known. If the device determines that target object is known, the device may confirm the target object to the user. If the device determines that the target object is not known, the device may then determine a group of characteristics for use in determining the object from potential (Continued)

target objects, and may select a characteristic that most substantially reduces a number of potential target objects. After the characteristic is determined, the device may formulate an inquiry to the user utilizing the characteristic. Characteristics may be selected until the device determines the target object and confirms it to the user.

21 Claims, 4 Drawing Sheets (56) References Cited

U.S. PATENT DOCUMENTS

| | | | | |
|---|---|---|---|---|
| 8,374,421 B1* | 2/2013 | Hickman | ............... | B25J 9/1697 318/568.12 |
| 8,380,349 B1* | 2/2013 | Hickman | ............. | G05D 1/0246 700/247 |
| 8,386,078 B1* | 2/2013 | Hickman | .......... | G06F 17/30194 318/568.1 |
| 8,386,079 B1* | 2/2013 | Kohler | ............... | G06K 9/00362 700/246 |
| 8,447,863 B1* | 5/2013 | Francis, Jr. | ....... | G06F 17/30542 707/724 |
| 8,890,896 B1* | 11/2014 | Tseng | .................. | G06T 7/0018 340/435 |
| 8,918,208 B1* | 12/2014 | Hickman | ............... | B25J 9/1697 700/1 |
| 9,067,315 B2* | 6/2015 | Kawamoto | .............. | B25J 13/08 |
| 9,205,886 B1* | 12/2015 | Hickman | ............. | G05D 1/0246 |
| 9,321,176 B1* | 4/2016 | Sun | ........................ | B25J 9/1612 |
| 9,457,474 B1* | 10/2016 | Lisso | ..................... | B25J 9/1697 |
| 9,785,911 B2* | 10/2017 | Galluzzo | .................. | B25J 9/162 |
| 2002/0158599 A1* | 10/2002 | Fujita | .................... | B25J 13/003 318/568.11 |
| 2005/0114325 A1* | 5/2005 | Liu | ................... | G06F 17/30265 |
| 2006/0013470 A1* | 1/2006 | Nagatsuka | ........... | G06K 9/6255 382/153 |
| 2006/0147087 A1* | 7/2006 | Goncalves | ........... | G06K 9/3233 382/103 |
| 2008/0195566 A1* | 8/2008 | Lee | ....................... | G06N 3/004 706/14 |
| 2009/0141940 A1* | 6/2009 | Zhao | ................. | G06K 9/00295 382/103 |
| 2009/0162822 A1* | 6/2009 | Strachan | ........... | G06F 17/30056 434/309 |
| 2010/0094872 A1* | 4/2010 | Lehmuskallio | ... | G06F 17/30247 707/737 |
| 2010/0260426 A1* | 10/2010 | Huang | .............. | G06F 17/30247 382/218 |
| 2011/0025876 A1* | 2/2011 | Denzler | ............ | G06F 17/30256 348/222.1 |
| 2011/0047594 A1* | 2/2011 | Mahaffey | .............. | G06F 21/564 726/1 |
| 2011/0076653 A1* | 3/2011 | Culligan | .................. | G09B 7/00 434/157 |
| 2011/0218984 A1* | 9/2011 | Gaash | ............... | G06F 17/30241 707/706 |
| 2011/0299770 A1* | 12/2011 | Vaddadi | ................ | G06K 9/6211 382/165 |
| 2012/0011142 A1* | 1/2012 | Baheti | ................... | G06K 9/4671 707/769 |
| 2012/0053728 A1* | 3/2012 | Theodorus | ......... | G06K 9/00664 700/259 |
| 2012/0057032 A1* | 3/2012 | Jang | ........................ | G06K 9/228 348/207.1 |
| 2012/0197439 A1* | 8/2012 | Wang | ..................... | B25J 9/1689 700/259 |
| 2013/0030570 A1* | 1/2013 | Shimizu | .................. | B25J 9/1679 700/259 |
| 2013/0166591 A1* | 6/2013 | Nandyal | ........... | G06F 17/30277 707/769 |
| 2013/0325244 A1* | 12/2013 | Wang | ..................... | G05D 1/028 701/26 |
| 2014/0059037 A1* | 2/2014 | Swaminathan | ..... | G06F 17/3028 707/713 |
| 2014/0279733 A1* | 9/2014 | Djugash | ............... | G06N 99/005 706/12 |
| 2014/0358884 A1* | 12/2014 | Nandyal | ........... | G06F 17/30277 707/707 |
| 2015/0032252 A1* | 1/2015 | Galluzzo | .................. | B25J 5/007 700/218 |
| 2015/0061895 A1* | 3/2015 | Ricci | ........................ | H04W 4/22 340/902 |
| 2015/0127430 A1* | 5/2015 | Hammer, III | ........ | G06Q 10/087 705/7.35 |
| 2015/0290795 A1* | 10/2015 | Oleynik | .................. | G05B 19/42 700/257 |
| 2015/0314440 A1* | 11/2015 | Parker | .................... | B25J 9/1689 700/253 |
| 2015/0339517 A1* | 11/2015 | Liu | .................... | G06K 9/00288 382/115 |
| 2016/0006945 A1* | 1/2016 | Furuhashi | ......... | G06F 17/30247 348/239 |
| 2016/0039094 A1* | 2/2016 | Lundberg | ................ | B25J 9/1692 700/251 |
| 2016/0059412 A1* | 3/2016 | Oleynik | ................... | B25J 9/163 700/257 |
| 2016/0067864 A1* | 3/2016 | Mullan | .................. | B25J 9/1605 700/19 |
| 2016/0078366 A1* | 3/2016 | Kaplan | .................. | G06N 3/008 706/12 |
| 2016/0283797 A1* | 9/2016 | Chung | ................. | G06K 9/00771 |
| 2016/0346923 A1* | 12/2016 | Kesil | ........................ | B25J 9/163 |

* cited by examiner

MACHINE OBJECT DETERMINATION BASED ON HUMAN INTERACTION

TECHNICAL FIELD

The present disclosure relates to machine interface systems, and more particularly, to a system for facilitating human-machine interaction to expedite the machine locating an object.

BACKGROUND

The quick pace of technological advancement has resulted in a proliferation of electronic devices into various aspects of everyday existence. For example, a person may employ a mobile device to perform a variety of different activities such as communication (e.g., telephone calls, email, social media, etc.), financial transactions, business transactions, navigation-related tasks, entertainment, etc. These types of activities require the person to interact with the mobile device to provide instruction, direction, selection, etc. While typing on physical keys was originally the manner in which this interaction took place, human interface technology has evolved to the point that users may now, for example, type on virtual keys, swipe across the screen, talk to the device and even make gestures in midair that the device captures (e.g., via a visual sensor like a camera) and interprets as different commands. These new avenues of interaction may help to bridge the communication gap between man and machine and further the acceptance of new technologies.

The above mobile device scenario is well known example of a category of development in human machine interaction. The acceptance of new technologies may depend on, in a large part, successful utilization by people. Introducing new technologies may become problematic when end users cannot successfully interact with the technology. This becomes more difficult when the end users are not experts in technology and can only perform the interaction utilizing common prose (e.g., natural language). For example, if a user was to interact with a robot and the interaction proved to be extremely cumbersome, difficult, etc., it may be prohibitive for the user to employ the technology again. Users do not want to wrestle with attempting to verbalize something to a device such as a mobile device, computer (e.g., a search engine), a robot, etc. in manner that may require, for example, a large amount of situational description, refinement and possible re-initialization when the inquiry ends up going down the completely wrong path. The user may simply give up and proceed to manually execute whatever operation they were trying to request. This may result in the user abandoning the technology as not ready for everyday use.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure pertains to machine object determination based on human interaction. In general, a device such as a robot may be capable of interacting with a person (e.g., user) to select an object. The user may identify the target object for the device, which may determine whether the target object is known. If the device determines that target object is known, the device may confirm the target object to the user. If the device determines that the target object is not known, the device may then determine a group of characteristics for use in determining the object from potential target objects, and may select a characteristic that most substantially reduces a number of potential target objects. The potential target objects may be determined based on the device scanning an area in which the device is operating, based on a context of the area, etc. The group of characteristics may be based on, for example, potential target object characteristics, the ability of the device to sense potential objects in the area, etc. After the characteristic is determined, the device may formulate an inquiry to the user based on the characteristic. Characteristics may be selected until the device determines the target object and confirms the target object to the user.

In at least one embodiment, an example device to be controlled by human interaction may comprise at least user interface circuitry, memory circuitry and processing circuitry. The user interface circuitry may be to receive input from a user and generate output to the user. The memory circuitry may be to store data at least regarding objects known to the device. The processing circuitry may be to at least receive input from the user interface circuitry, access the memory circuitry to determine if a target object identified in the input from the user is known to the device and cause the user interface circuitry to generate output to the user regarding whether the target object is known by the device.

In at least one embodiment, the device may be a robot. In generating the output the processing circuitry may be to, for example, cause the user interface circuitry to confirm the target object to the user based on a determination that the target object is known to the device and cause the user interface circuitry to present an inquiry to the user based on a determination that the target object is unknown to the device. The processing circuitry may further be to, for example, formulate the inquiry based on a characteristic of the target object. The processing circuitry may further be to, for example, select the characteristic from a group of characteristics based on the characteristic most substantially reducing a number of potential target objects. If more than one potential target object is determined to exist, the processing circuitry may further be to, for example, reduce the number of target objects based on input received in response to the inquiry and select another characteristic to formulate another inquiry. The processing circuitry may further be to, for example, determine the group of characteristics based on potential target object characteristics.

In at least one embodiment, the device may further comprise sensing circuitry. The processing circuitry may further be to, for example, determine the group of characteristics based on capabilities of the sensing circuitry. The processing circuitry may further be to, for example, determine the potential target objects by causing the sensing circuitry to scan an area in which the device is operating. The processing circuitry may further be to, for example, determine the potential target objects based on a context corresponding to an area in which the device is operating. Consistent with the present disclosure, an example method for object determination may comprise initiating object determination in a device, receiving input from a user via user interface circuitry in the device, accessing memory circuitry in the device to determine if a target object identified in the input from the user is known to the device and causing the user interface circuitry to generate output to the user regarding whether the target object is known by the device.

Figure 1:
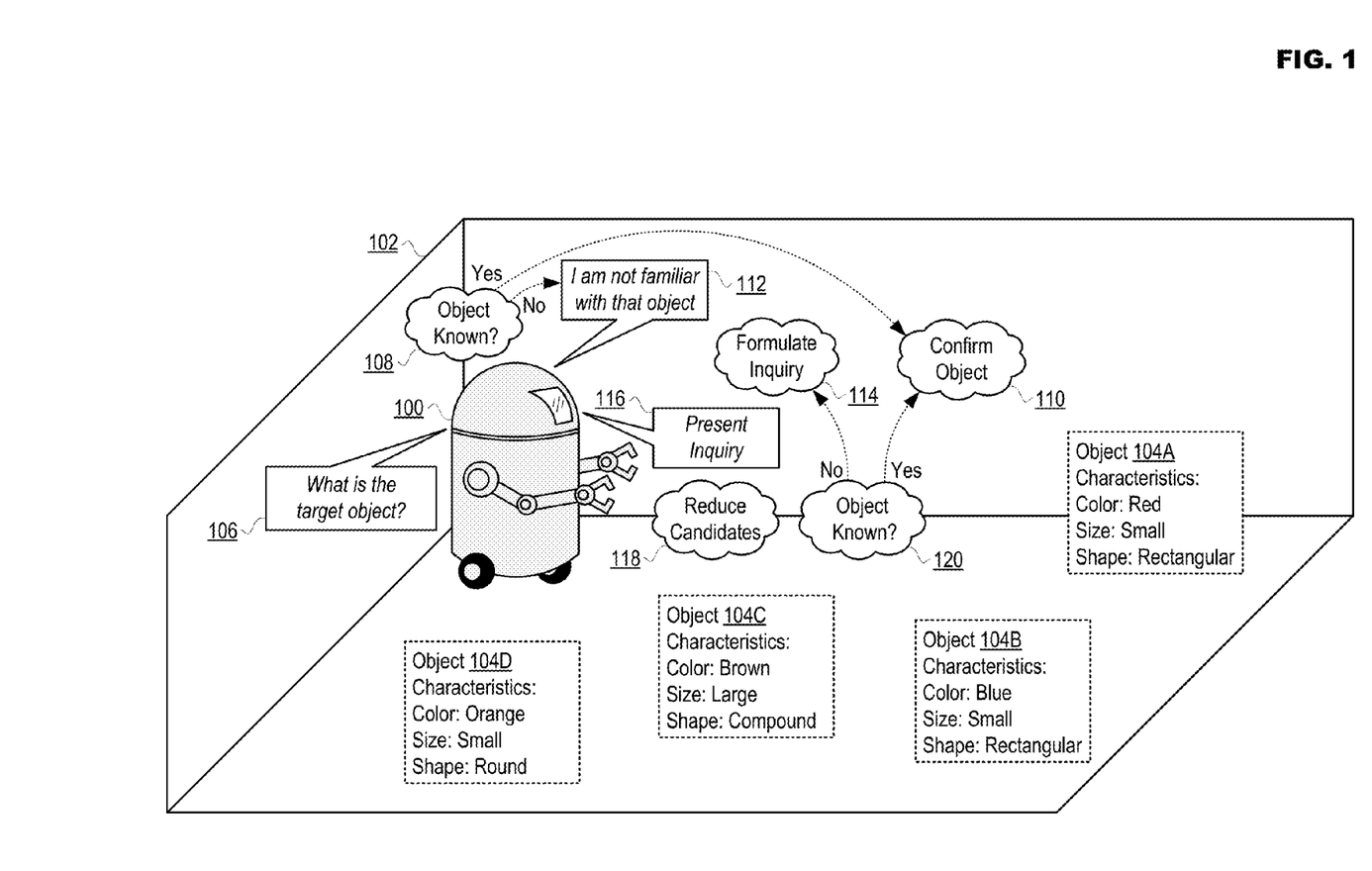
FIG. 1 illustrates an example device performing machine object determination based on human interaction in accordance with at least one embodiment of the present disclosure.

FIG. 1 illustrates an example device performing machine object determination based on human interaction in accordance with at least one embodiment of the present disclosure. The various implementations discussed herein may utilize technologies such as visual sensing, depth sensing, etc., and applications such as robotic control, etc. These particular technologies and/or applications are offered merely as readily comprehensible examples from which the teachings discussed herein may be understood. Other technologies, applications, etc. may be implemented consistent with the present disclosure. In addition, the inclusion of an apostrophe after an item number in a drawing figure (e.g., 100') indicates that an example embodiment of the particular item number is shown. These embodiments are not intended to limit the present disclosure to only what is illustrated, and have been presented herein merely for the sake of explanation. The example scenarios presented herein may present device 100 as a robot. In general, a "robot," as referenced herein, may be any machine or apparatus that receives commands from a person (e.g., a user) and performs activities based on these commands in an autonomous or semi-autonomous manner. In some instances the commands relate to a certain object to be recognized by the robot.

An example device 100 operating within an area or environment 102 is shown in FIG. 1. While device 100 is represented in FIG. 1 as a single device (e.g., a robot), it is also possible for device 100 to be a system made up of more than one device. For example, a first device (e.g., a remote controller) may receive instructions from a user while a second device (e.g., a robot) may perform activities based on the instructions. In the instance of a multi-device system, the devices may be collocated and/or remotely located. While device 100 is represented herein as a robot, other examples of device 100 may include, a mobile communication device such as a cellular handset or a smartphone based on the Android® OS from the Google Corporation, iOS® or Mac OS® from the Apple Corporation, Windows® OS from the Microsoft Corporation, Linux® OS, Tizen® OS and/or other similar operating systems that may be deemed derivatives of Linux® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, Apple Watch® from the Apple Corporation, etc., an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc.

Device 100 may comprise at least circuitry that allows it to receive instructions from a user regarding a target object that the user believes or suspects is within area 102 and determine whether an object within area 102 is the object. Example circuitry will be discussed in regard to FIG. 2. In an example of operation, device 100 may operate within area 102. Area 102 may be, for example, any environment in which a robot may operate including inside a structure (e.g., a building, vehicle, etc.) or in the outdoors. In at least one embodiment, device 100 may be aware of the contents of area 102 at least in regard to potential target objects. This awareness may be derived from actual scanning of area 102, from a context associated with the area 102, etc. The actual scanning of area 102 may be performed by device 100 itself or by another system that may provide the scan data to device 100. Scanning may include visible image or video capture, depth sensing based on infrared (IR), radar, LIDAR or sonic sensing technologies, proximity detection based on electronic, magnetic or sonic sensing technologies, etc. Device 100 may use scanning to, for example, perform simultaneous location and mapping (SLAM) in area 102 for location determination, to avoid obstacles, to locate objects 104A . . . D, etc. A context of area 102 may be determined based on user input, data provided to device 100, etc., and may include a category of area 102 such as, for example, a type of area (e.g., city, forest, desert, etc.), structure (e.g., house, office building, school, restaurant, etc.), room (e.g., bedroom, bathroom, classroom, office, etc.), vehicle (e.g., automobile, car, van, airplane, train, bus, etc.) or another classification. Device 100 may then determine the objects present in area 102. For example, the objects that are present in area 102 include object 104A, object 104B, object 104C and object 104D (collectively, "objects 104A . . . D"). While only four example objects 104A . . . D are shown, less or more objects may be in area 102. Device 100 may be aware of objects 104A . . . D through scanning or may "assume" their presence based on the context of area 102 (e.g., device 100 may assume that an office will probably include a desk, at least one chair, writing implements, paper, a computer, books, etc.). These assumptions may be preprogrammed into device 100, provided by the user, provided by another system in communication with device 100 in a responsive or proactive manner, etc.

Each of objects 104A . . . D may comprise associated characteristics. Device 100 may be programmed with a variety of characteristics from which a group of characteristics are selected for use in determining the target object. Example characteristics are shown in FIG. 1 including object color, size and shape. In at least one embodiment, the characteristics may be expressible utilizing natural language (e.g., common prose). At least one benefit of utilizing nature language characteristics is that any user, regardless of technical skill, may interact clearly and quickly with device 100. The group of characteristics may be selected based on, for example, characteristics sensed or commonly associated with objects 104A . . . D, based on the capabilities of device 100 to sense characteristics, etc. Device 100 may be capable of, for example, determining at least one color, size (e.g., height, width, depth, diameter, etc.), shape, material composition, components (e.g., identifying a compound object including more than one component), functionality, texture, reflectivity, conductivity, magneticity, temperature, ownership (e.g., based on location, indicia, etc.), temporal data (e.g., last time scanned), position, etc. corresponding to objects 104A . . . D, reading text on various surfaces of objects 104A . . . D, etc. However, a characteristic of "weight" may not be selected for the group of characteristics if device 100 cannot determine a weight for each object 104A . . . D based on, for example, typical weight data for each of objects 104A . . . D, actually weighing objects 104A . . . D, etc. The characteristic group may also be selected based on what has empirically proven to be good characteristics for determining target objects (e.g., using color, size and shape as characteristics may have been very effective in previous determinations).

Consistent with the present disclosure, a user may identify a target object to device 100 as shown 106. Device 100 may inquire about the target object, the user may input the identity, etc. The user may interact with device 100 via verbal communication (e.g., speaking), via electronic communication (e.g., typing on a local or remote keyboard), via gestures, etc. For example, the user may simply speak the instructions, "Robot, please retrieve my smart phone." Device 100 may then determine whether the identified object is known as shown at 108. For example device 100 may be preprogrammed with object identifications (IDs) or may formulate a database of object IDs through various user interactions. If the object is determined to be known, then device 100 may confirm the target object to the user as shown at 110. Confirming the target object to the user may include, for example, device 100 presenting a representation (e.g., picture, shape, etc.) of the target object, audibly describing the target object (e.g., characteristics of the target object), pointing to one of objects 104A . . . C in area 102 (e.g., with a movable arm, with a laser indicator, etc.), moving towards and/or obtaining one of objects 104A . . . D in area 102, etc.

If device 100 determines that the object is not familiar with the identified target object, it may, for example, state as much as shown at 112 and then formulate an inquiry as shown at 114. Consistent with the present disclosure, at least one objective may be to select questions that may allow device 100 to most quickly determine the target object. This may enhance user experience in that the time it takes for a user to describe the object to device 100 may also be minimized. In determining an inquiry device 100 may proceed to determine a characteristic from the group of characteristics that most significantly reduces the number of potential target objects in area 102. The details of how this may be determination may proceed will be discussed in regard to FIGS. 3 and 4. In terms of the example presented in FIG. 1, device 100 may determine that the color of objects 104A . . . D may be most impactful in that objects 104A . . . D are all different colors. This is an extreme example, and in many cases the most impactful characteristic may not have such a large impact. Once the characteristic is selected, device 100 may present an inquiry to the user as shown at 116. The inquiry may be presented audibly, visually (e.g., on a display), etc. For example, the inquiry may ask, "What is the main or predominant color of the target object?" The inquiry may also comprise relative questions such as asking the user whether the target object is larger or smaller, lighter or darker, smoother or rougher, etc. than one of objects 104A . . . D. The response of the user may then be employed to reduce the number of potential target objects (e.g., to eliminate any objects 104A . . . D that do not comply with the response of the user) as shown at 118. Device 100 may then attempt to determine if the object is known as shown at 120 (e.g., if only one object 104A . . . D) remains. This may be the case in the example of FIG. 1 if color was the characteristic selected. If the object is determined to be known by device 100 then the object may be confirmed as shown at 110. Otherwise, device 100 may continue to formulate inquiries as shown at 114 until the object is determined to be known as shown at 120. Again, selecting the next most impactful characteristic from the remaining characteristics in the group may expedite the determination of the target object and improve user experience interacting with device 100.

Figure 2:
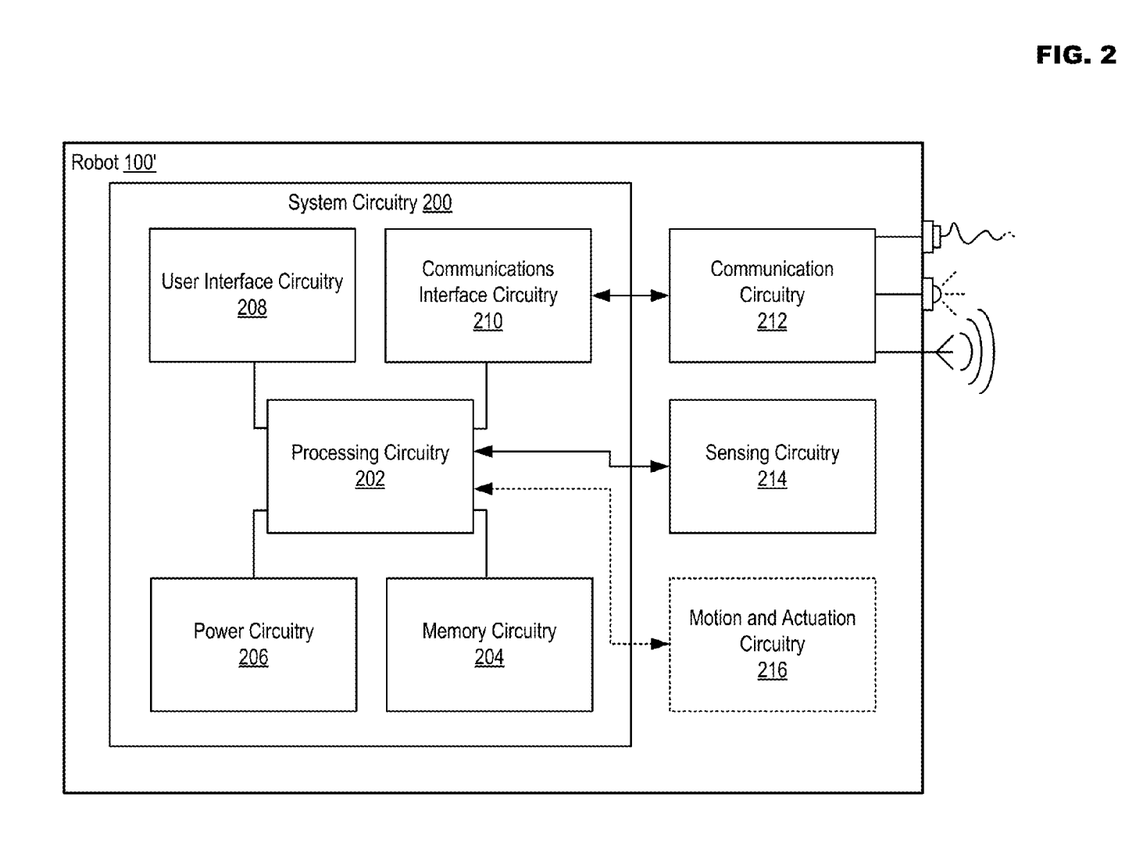
FIG. 2 illustrates an example configuration for a device usable in accordance with at least one embodiment of the present disclosure.

FIG. 2 illustrates an example configuration for a device usable in accordance with at least one embodiment of the present disclosure. Device 100' may be capable of performing any or all of the activities illustrated in FIG. 1. While only one device 100' is shown in FIG. 2, consistent with the present disclosure multiple devices may cooperate to perform the activities associated with device 100'. Device 100' is presented only as an example of an apparatus that may be used in various embodiments consistent with the present disclosure, and is not intended to limit any of the various embodiments to any particular manner of configuration, implementation, etc.

Device 100' may comprise at least system circuitry 200 to manage device operation. System circuitry 200 may include, for example, processing circuitry 202, memory circuitry 204, power circuitry 206, user interface circuitry 208 and communications interface circuitry 210. In addition, device 100' may also include communication circuitry 212, sensing circuitry 214, and motion and actuation circuitry 216. While communication circuitry 212, sensing circuitry 214, and motion and actuation circuitry 216 are illustrated as separate from system circuitry 200, the configuration of device 100' has been provided herein merely for the sake of explanation. Some or all of the functionality associated with communication circuitry 212, sensing circuitry 214, and motion and actuation circuitry 216 may also be incorporated into system circuitry 200.

In device 100', processing circuitry 202 may comprise one or more processors situated in separate components, or alternatively one or more processing cores situated in one component (e.g., in a System-on-Chip (SoC) configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors or any other evolution of computing paradigm or physical implementation of such integrated circuits (ICs), etc. Examples of support circuitry may include chipsets (e.g., Northbridge, Southbridge, etc. available from the Intel Corporation) configured to provide an interface via which processing circuitry 202 may interact with other system components that may be operating at different speeds, on different buses, etc. in device 100'. Moreover, some or all of the functionality commonly associated with the support circuitry may also be included in the same physical package as the processor (e.g., such as in the Sandy Bridge family of processors available from the Intel Corporation).

Processing circuitry 202 may be configured to execute various instructions in device 100'. Instructions may include program code configured to cause processing circuitry 202 to perform activities related to reading data, writing data, processing data, formulating data, converting data, transforming data, etc. Information (e.g., instructions, data, etc.) may be stored in memory circuitry 204. Memory circuitry 204 may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory circuitry configured based on BIOS, UEFI, etc. to provide instructions when device 100' is activated, programmable memories such as electronic programmable ROMs (EPROMS), Flash, etc. Other examples of fixed/removable memory may include, but are not limited to, magnetic memories such as hard disk (HD) drives, etc., electronic memories such as solid state flash memory (e.g., embedded multimedia card (eMMC), etc.), portable memory cards or sticks (e.g., micro storage device (uSD), USB, etc.), optical memories such as compact disc-based ROM (CD-ROM), Digital Video Disks (DVD), Blu-Ray Disks, etc.

Power circuitry 206 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface circuitry 208 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 208 may be incorporated within device 100' and/or may be coupled to device 100' via a wired or wireless communication medium. In an example implementation wherein device 100' is a multiple device system, user interface circuitry 208 may be optional in devices such as, for example, servers (e.g., rack/blade servers, etc.) that omit user interface circuitry 208 and instead rely on another device (e.g., an operator terminal) for user interface functionality.

Communications interface circuitry 210 may be configured to manage packet routing and other functionality for communication circuitry 212, which may include resources configured to support wired and/or wireless communications. In some instances, device 100' may comprise more than one set of communication circuitry 212 (e.g., including separate physical interface circuitry for wired protocols and/or wireless radios) managed by communications interface circuitry 210. Wired communications may include serial and parallel wired or optical mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, ZigBee, etc.), long range wireless mediums (e.g., cellular wide-area radio communication technology, satellite-based communications, etc.), electronic communications via sound waves, lasers, etc. In one embodiment, communications interface circuitry 210 may be configured to prevent wireless communications that are active in communication circuitry 212 from interfering with each other. In performing this function, communications interface circuitry 210 may schedule activities for communication circuitry 212 based on, for example, the relative priority of messages awaiting transmission. While the embodiment disclosed in FIG. 2 illustrates communications interface circuitry 210 being separate from communication circuitry 212, it may also be possible for the functionality of communications interface circuitry 210 and communication circuitry 212 to be incorporated into the same circuitry.

Consistent with the present disclosure, sensing circuitry 214 may be situated as a separate module as shown in FIG. 2 or, depending on the implementation, some or all of sensing circuitry 212 may fall within user interface circuitry 208. Sensing circuitry 212 may comprise at least one sensor and any required supporting circuitry (e.g., filtering circuitry, analog to digital converters, etc.) that may be needed to scan area 102 and/or objects 104A . . . D in area 102. Example sensors may include, but are not limited to, a red, green, blue (RGB) camera to capture visual data, an IR emitter/sensor to capture depth data, a combined visual/depth camera (e.g., a RealSense RGBD camera from the Intel Corporation), a motion sensor to sense direction, speed, acceleration, etc., an audio sensor to capture sound, a proximity sensor (e.g., touch, hall effect, etc.) and any other sensors for sensing data in area 102. Sensing circuitry 214 may interact with at least processing circuitry 202 to provide data regarding area 102, objects 104A . . . D, and in the instance of user interface circuitry 208, to present notifications and or inquiries to a user and receive instructions and/or responses from the user. Communications circuitry 210 and/or communication circuitry 212 may interact with processing circuitry 202 to, for example, transmit or receive data when the user interaction is conducted remotely (e.g., via remote control), receive scans of area 102 and/or objects 104A . . . D from an external system, etc. When device 100' is movable (e.g., a robot), motion and actuation circuitry 216 may include mechanisms such as, for example, mechanical assemblies, actuators, motors, etc. to cause device 100' to move, actuate arms or other parts (e.g., to confirm the target object) in response to control signals provided by processing circuitry 202.

Figure 3:
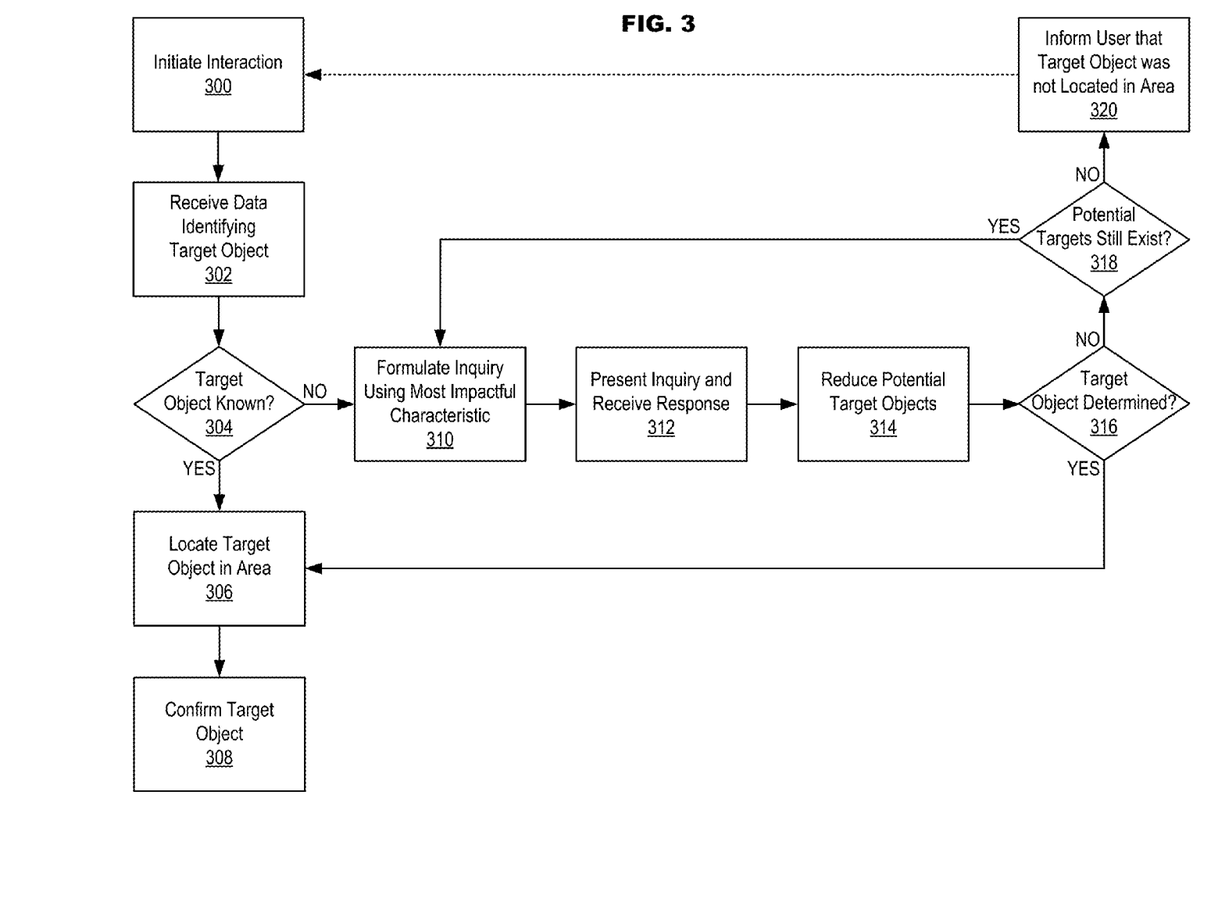
FIG. 3 illustrates example operations for object determination in accordance with at least one embodiment of the present disclosure.

FIG. 3 illustrates example operations for object determination in accordance with at least one embodiment of the present disclosure. Device 100 and the user may initiate interaction in operation 300. In operation 302 device 100 may receive data identifying the target object. The data may be provided by the user without prompting or in response to an inquiry presented by device 100. A determination may then be made in operation 304 as to whether the target object is known. The determination of operation 304 may be based on a database of objects known to device 100, the database comprising the identity of the object and one or more characteristics of the object that device 100 may use in locating the object in area 102. If in operation 304 it is determined that the target object is known, device 100 may utilize the one or more characteristics associated with the target object in the database to locate the object in area 102 in operation 306. Device 100 may locate the object by, for example, scanning area 102 utilizing sensing circuitry 214, based on sensor data provided to device 100 by an external system, etc. Device 100 may then confirm the object to the user in operation 308. Confirming the object may comprise, for example, device 100 identifying (e.g., visibly or audibly) the target object to the user, pointing towards the target object, moving towards the target object, obtaining the target object, etc.

If in operation 304 it is determined that the target object is not known, then in operation 310 an inquiry may be formulated using the most impactful characteristic. The most impactful characteristic may be, for example, the characteristic that most significantly reduces the number of potential target objects in area 102. An example embodiment of operation 310 is disclosed in regard to FIG. 4. In operation 312 the inquiry may be presented to the user and a response may be received from the user. Device 100 may then reduce the potential target objects based on the response received from the user in operation 314, and a further determination may be made as to whether the target object has been determined (e.g., only one potential target object remaining). A determination in operation 316 that the target object has been determined may be followed by operation 316 to locate the target object. If in operation 316 the target object is not determined, then in operation 318 a further determination may be made as to whether potential target objects still exist in area 102. A determination in operation 318 that potential target objects still exist may be followed by a return to operation 310 to formulate another inquiry. If in operation 318 it is determined that no potential target objects exist within area 102, then in operation 320 device 100 may inform the user that the target object was not located in area 102. Operation 320 may optionally be followed by a return to operation 300 to reinitiate the search for the target object.

Figure 4:
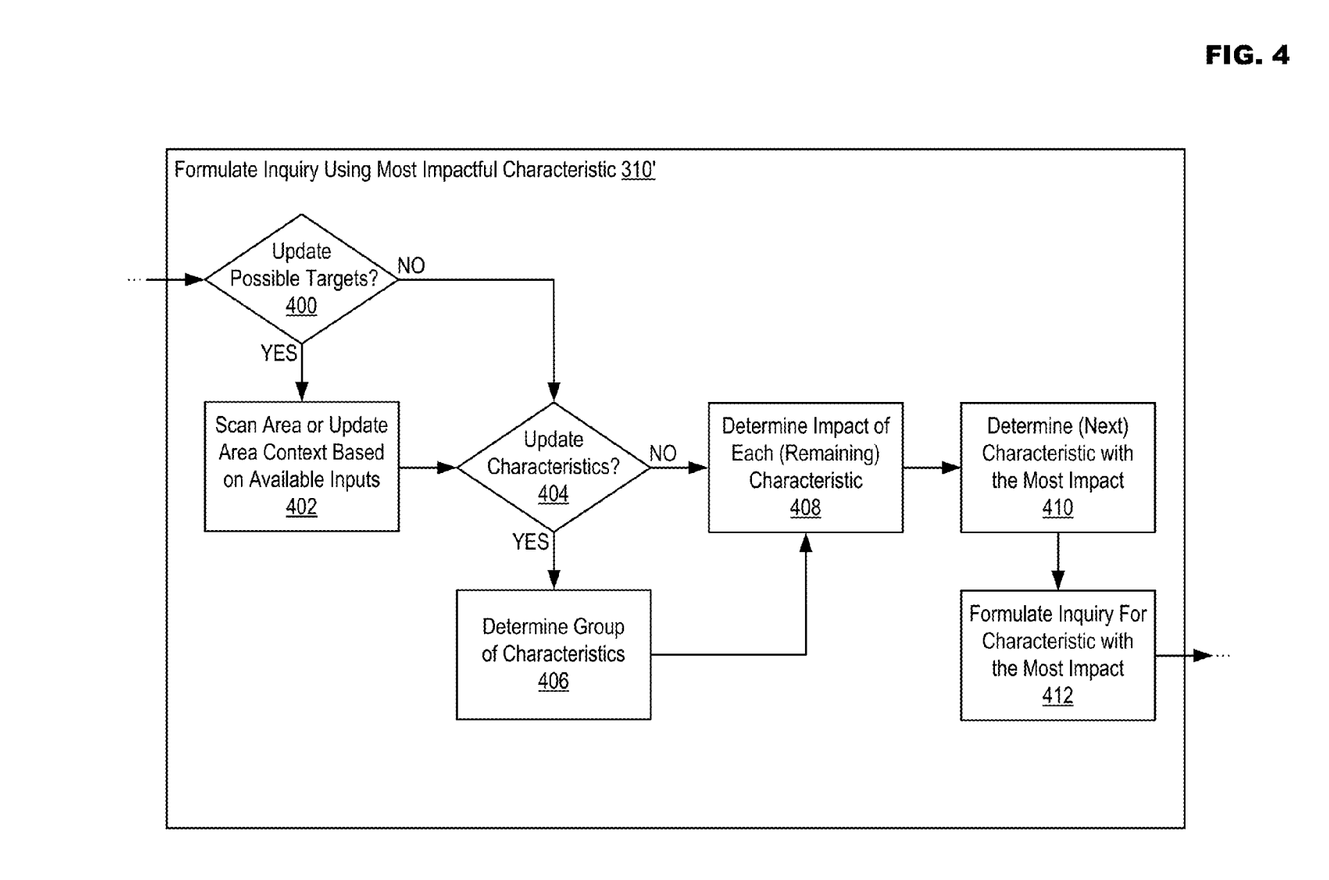
FIG. 4 illustrates example operations for characteristic selection in accordance with at least one embodiment of the present disclosure.

FIG. 4 illustrates example operations for characteristic selection in accordance with at least one embodiment of the present disclosure. Operations 400 to 412 illustrated in FIG. 4 are an embodiment of operation 310' from FIG. 3 wherein an inquiry is formulated using the most impactful characteristic. Operations 400 to 412 will be explained below, and then followed by example pseudocode that describes how the impact of each characteristic (e.g., also identified below as "features" or "attributes") may be determined based on a concept of information gain.

Operation 400 may follow operation 308 in FIG. 3. In operation 400 a determination may be made as to whether the possible target objects in area 102 need to be updated. An update may be needed if, for example, this is the first iteration of inquiry formulation, if a change in area 102 is detected, etc. If in operation 400 it is determined that an update is required, device 100 may rescan area 102 or update the potential target objects based on available inputs (e.g., from an external system, from user input, etc.). Following either a "no" determination in operation 400 or operation 402, a further determination may be made in operation 404 as to whether the group of characteristics that device 100 will use to determine the target object need to be updated. An update may be required in operation 404 if, for example, this is the first iteration of inquiry formulation, if a change is detected regarding the potential target objects in area 102, etc. If in operation 404 it is determined that an update is required, device 100 may determine a group of characteristics based on, for example, the potential target objects within area 102, the scanning abilities of device 100, etc. Following either a "no" determination in operation 404 or operation 406, in operation 408 an impact of each characteristic, or of each remaining characteristic if this is the second or later iteration of the operations, may be determined. The characteristic having the most impact, or the next most impact if this is the second or later iteration of the operations, may then be determined in operation 410, and an inquiry regarding the inquiry determined to have the most impact in operation 410 may then be formulated in operation 412. Operation 412 may be followed by operation 312 in FIG. 3 wherein the inquiry may be presented to the user and a response to the inquiry may be received from the user.

An example implementation is presented below as portions of pseudocode that describe how at least one embodiment consistent with the present disclosure may operate. The following code portions are merely examples, and are not intended to limit the embodiments to operating in a particular manner. Prior to implementing procedural blocks in the example pseudocode, one or more variables that will be used as inputs to the pseudocode may be declared and initialized:

```
Declarations & Initializations:
    Identified ← F; confirmed ← F; found ← F
    Object Feature List : features = {F1, F2, ..., Fn}
    objDb Feature List : OF is subset of F
    objF is subset of OF
    userLocInput ← Location explicit input from user
locationList ← Map annotated w/ areas where the object can be
found
```

Inputs may include, but are not limited to an objDb, which may be an object database where the set of known objects are stored, a locationList in the space (e.g., area 102) where the search will be held including a map annotated with areas that are candidates for search. A finite feature list features (e.g., object characteristics) may be assumed to describe objects 104A . . . D. The search may end after the target object has been determined, meaning the object has been identified by device 100 and confirmed by the user as the object of interest.

As shown below, device 100 may execute lookforKnownObj when the target object obj is known and lookforUnknownObj when obj is unknown. While device 100 looks for obj, it may first identify potential target objects in area 102 by segmenting out the potential target objects and then creating a statistical representation based on the features of interest in context of obj. In case obj is known, device 100 may extract the features of interest of the object from objDb—objF. When obj is unknown, all of the feature list—features that may describe any object may be referenced.

```
main ( ) {
    if elementOf(obj, objDb) { /* Check if this object (obj) is
in
    object database (objDb) */
    lookforKnownObj((obj, map, locationList, objDb);
    }
    else {
    lookforUnknownObj (obj, map, locationList, objDb);
    }
    /* end while */}
    if (~found)
        return ("Sorry ... I looked all around and could not
    find") ;
    else return("Any other orders ?");
}
```

A statistical representation of all potential target objects in area 102 may be utilized to navigate to the most probable locations within area 102. For example, if device 100 is looking for a green apple, it will go to the location where there may be a predominance of green objects and skip any areas where the potential target objects are not green. The user also can optionally lead the robot to the area most probable to find the object (e.g., userlocInput).

In instances where device 100 is searching for a known obj, the ORQAsearch flow may be performed since the features with which obj is classified are known. When obj is not known, the ORQAclassifySearch flow may be executed (e.g., where device 100 may identify the features with which to classify the potential target objects through inquiries to the user). To generate a plausible real world interaction, device 100 may attempt to minimize the interaction by selecting a set of questions that provides enough information to find obj. The classify WithNBestFeatures flow presented below may allow the robot to ask "good" questions that may help to distinguish the obj from the other potential target objects. The most prominentFeature may help to classify the obj by computing the feature that will give the most information gain.

```
lookForKnownObj (obj, map, locationList, objDb) {
        objF ← extractFeatures(obj);
    candidates ← extractObjectCandidates(map, objF)
            while (locationList &~found) {
        loc ←navigate2MostProbableArea(locationList,
    candidates,
    userLocInput);
        ORQAsearch(loc, obj, map, objDb, candidates,
    objF);
            locationList ← locationList - loc;
            }
        }
    lookforUnknownObj (obj, map, locationList, objDb) {
        candidates ← extractObjectCandidates(map, features);
            while (locationList &~found) {
        loc ←navigate2MostProbableArea(locationList,
        candidates, userLocInput);
            ORQAclassifySearch(loc, obj, map, objDb,
        candidates, { });
            locationList ← locationList - loc
            }
        }
    extractObjectCandidates(localEnv, featureList) {
        candidateObjects ← Segment Objects(localEnv)
        extractFeatures(candidateObjects, featureList)
        candidates ← { (candidateObji, featuresObji)}
        }
```

Navigate in Space and Search a Known Object obj

```
ORQAsearch(localEnv, obj, objDb, candidates, objF) {
    while ( ~confirmed & candidates) {
        {identified, candidates} ←
        classifyWithNBestFeatures(candidates, obj, objF)
        if identified {
            confirmed ← Ask user to confirm the identified
        obj –identifiedObj
        if confirmed {
            report (identifiedObj)
            store identifiedObj in objDb as another sample
            found ← T;
            return (found);
        } /* if confirmed */
        candidates ← {candidates - identifiedObj};
        } /* if identified */
    }return ( "I am giving up ! Can't Find in this area" )
}
```

Navigate in Space and Search an Unknown Object

```
ORQAClassifySearch(localEnv, obj, objDb, candidates, objF) {
    while (~confirmed & candidates) {
        {identified, candidates} ←
        classifyWithNBestFeatures(candidates, obj, objF)
        if ( identified) {
            confirmed ← Ask user to confirm the identified
        obj " identifiedObj"
            if confirmed {
            report (identifiedObj)
            store identifiedObj in objDb
            found ← T;
            return("Found ... Hurray !");
            } else {
                candidates ← {candidates - identifiedObj};
                objF ← objF +
            {Ask user comparison questions (identifiedObj, obj)}
                }
            }
        } return ( "I am giving up ! Can't find in this area ")
}
classifyWithNBestFeatures(candidates, obj, featureList) {
    while (featureList & (size(candidates) > 1) ) {
        prominentFeature ←
    identifyProminentFeatures ( candidates, featureList)
    /* Robot via depth camera computes the values of the
    features of the candidates &identifies the feature that gives
    most information gain(see next page) as the most prominent */
        featuresList ← featureList - prominentFeature
        featureValue ← getValue(prominentFeature, obj,
    objDb, userInput (optional))
        /* Robot in case of unknown objects will ask from the user
    info on the value; if obj is known it will get the value from
    objDb*/
        candidates ← filterCandidates(candidates,
    prominentFeature, featureValue)
        } if (size(candidates) == 1) return (T, candidates)
        else (F, candidates)
}
```

As explained in the pseudo procedure above, classifyWithNBestFeatures(candidates, obj, featureList) may cause device 100 to interact with the user to interrogate the user (e.g., present inquiries) on the value of the feature that will help most to identify/recognize the object. Given a set of potential target objects, at least one objective may be to single out obj using the smallest number of questions on average. To do so, inquiries may be presented to the user that attempt to provide the most information and eliminate the most uncertainty. For example, asking about the color of obj will not further distinguish obj from other potential target objects if all of the potential target objects are the same color. To determine the most impactful feature in a data set (e.g., group of characteristics), information gain may be calculated for each of the features. Once the attribute is selected and a response is received from the user, the potential target objects may be reduced based on the user response. If more than one potential target object remains, information gain may be recalculated for the remaining features. This operation may be repeated until no object is found or no more information gain is possible.

Entropy H(S) is a measure of the amount of uncertainty in the (data) set S. An equation for determining H(S) follows:

$$H(S) = -\Sigma_{x \in X} P(x) \log_2 p(x) \tag{1}$$

Wherein S is a current data set for which entropy is being calculated, X is a set of classes in S, p(x) is the proportion of the number of elements in class x to the number of elements in set S. In at least one embodiment, p(x) may be $1/|S|$, since each p is given its own class. Information gain IG(A) is the measure of the difference in entropy from before to after the set S is split on an attribute A. In other words, IG(A) is how much uncertainty in S was reduced after splitting set S based on attribute A. An equation for IG(A) may be as follows:

$$IG(A,S) = H(S) - \Sigma_{t \in T} p(t) H(t) \qquad (2)$$

Wherein H(S) is the entropy of set S, T are the subsets created from splitting set S by attribute A such that $S = \cup_{t \in T} t$, p(t) is the proportion of the number of elements t in to the number of elements in set S and H(t) is Entropy of subset t. Using this relationship, information gain may be calculated for each remaining attribute. The attribute with the largest information gain may be utilized to split the set in the present iteration (e.g., the largest information gain attribute may be used to formulate an inquiry to the user). For example, if the information gain for size is determined to be 1.459, the information gain for color is determined to be 1.585 and the information gain for shape is determined to be 1.459, the next inquiry may be based on color since it had the largest information gain. Device 100 may present an inquiry to the user about the color of the target object. After the number of potential target objects is reduced based on the response of the user, the target object may be determined or another inquiry may be presented. In the instance that another inquiry is required, the information gain may be recalculated for the remaining attributes to determine the next most impactful attribute (e.g., shape or size).

While FIGS. 3 and 4 illustrate operations according to different embodiments, it is to be understood that not all of the operations depicted in FIGS. 3 and 4 are necessary for other embodiments. Indeed, it is fully contemplated herein that in other embodiments of the present disclosure, the operations depicted in FIGS. 3 and 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, this disclosure pertains to machine object determination based on human interaction. In general, a device such as a robot may be capable of interacting with a person (e.g., user) to select an object. The user may identify the target object for the device, which may determine whether the target object is known. If the device determines that target object is known, the device may confirm the target object to the user. If the device determines that the target object is not known, the device may then determine a group of characteristics for use in determining the object from potential target objects, and may select a characteristic that most substantially reduces a number of potential target objects. After the characteristic is determined, the device may formulate an inquiry to the user utilizing the characteristic. Characteristics may be selected until the device determines the target object and confirms it to the user.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for machine object determination based on human interaction.

According to example 1 there is provided a device to be controlled by human interaction. The device may comprise user interface circuitry to receive input from a user and generate output to the user, memory circuitry to store data at least regarding objects known to the device; and processing circuitry to at least receive input from the user interface circuitry, access the memory circuitry to determine if a target object identified in the input from the user is known to the device, and cause the user interface circuitry to generate output to the user regarding whether the target object is known by the device.

Example 2 may include the elements of example 1, wherein the device is a robot.

Example 3 may include the elements of example 2, wherein the device comprises at least a robot portion and a remote control portion.

Example 4 may include the elements of any of examples 2 to 3, and may further comprise motion and actuation circuitry to cause the robot to at least one of move or actuate at least one portion of the device.

Example 5 may include the elements of any of examples 1 to 4, wherein the user interface circuitry is to at least receive verbal communication from the user and at least one of present data audibly or visibly to the user.

Example 6 may include the elements of example 5, wherein in receiving verbal communication the device is to interpret natural language communication and in presenting data the user interface circuitry is to communicate utilizing natural language.

Example 7 may include the elements of any of examples 1 to 6, wherein in generating the output the processing circuitry is to cause the user interface circuitry to confirm the target object to the user based on a determination that the target object is known to the device, or present an inquiry to the user based on a determination that the target object is unknown to the device.

Example 8 may include the elements of any of examples 1 to 7, wherein in generating the output the processing circuitry is to cause the user interface circuitry to confirm the target object to the user based on a determination that the target object is known to the device.

Example 9 may include the elements of example 8, wherein in confirming the target object the user interface circuitry is to at least one of present data regarding the target object, point to the target object, cause the device to move towards the target object or cause the device to obtain the target object.

Example 10 may include the elements of any of examples 1 to 9, wherein in generating the output the processing circuitry is to cause the user interface circuitry to present an inquiry to the user based on a determination that the target object is unknown to the device.

Example 11 may include the elements of example 10, wherein the processing circuitry is to formulate the inquiry based on a characteristic of the target object.

Example 12 may include the elements of example 11, wherein the processing circuitry is to select the characteristic from a group of characteristics based on the characteristic most substantially reducing a number of potential target objects.

Example 13 may include the elements of example 12, wherein if more than one potential target object is determined to exist, the processing circuitry is to reduce the number of target objects based on input received in response to the inquiry and select another characteristic to formulate another inquiry.

Example 14 may include the elements of any of examples 12 to 13, wherein the processing circuitry is to determine the group of characteristics based on potential target object characteristics.

Example 15 may include the elements of example 14, further comprising sensing circuitry and wherein the processing circuitry is to determine the group of characteristics based on capabilities of the sensing circuitry.

Example 16 may include the elements of any of examples 14 to 15, wherein the processing circuitry is to determine the potential target objects by causing the sensing circuitry to scan an area in which the device is operating.

Example 17 may include the elements of any of examples 12 to 16, wherein the processing circuitry is to determine the potential target objects based on a context corresponding to an area in which the device is operating.

Example 18 may include the elements of any of examples 12 to 17, further comprising communication circuitry and wherein the processing circuitry is to determine the potential target objects based on data received from an external system via the communication circuitry.

According to example 19 there is provided a method for object determination. The method may comprise initiating object determination in a device, receiving input from a user via user interface circuitry in the device, accessing memory circuitry in the device to determine if a target object identified in the input from the user is known to the device and causing the user interface circuitry to generate output to the user regarding whether the target object is known by the device.

Example 20 may include the elements of example 19, wherein generating the output comprises causing the user interface circuitry to confirm the target object to the user based on a determination that the target object is known to the device or causing the user interface circuitry to present an inquiry to the user based on a determination that the target object is unknown to the device.

Example 21 may include the elements of example 20, wherein confirming the target object to the user comprises at least one of presenting data regarding the target object, pointing to the target object, causing the device to move towards the target object or causing the device to obtain the target object.

Example 22 may include the elements of any of examples 20 to 21 and may further comprise formulating the inquiry based on a characteristic of the target object.

Example 23 may include the elements of example 22, and may further comprise selecting the characteristic from a group of characteristics based on the characteristic most substantially reducing a number of potential target objects.

Example 24 may include the elements of example 23, wherein if more than one potential target object is determined to exist, further comprising reducing the number of target objects based on input received in response to the inquiry and selecting another characteristic to formulate another inquiry.

Example 25 may include the elements of any of examples 23 to 24, and may further comprise determining the group of characteristics based on at least one of potential target object characteristics or capabilities of sensing circuitry in the device.

Example 26 may include the elements of example 25, and may further comprise determining the potential target objects based on at least one of scanning an area in which the device is operating with the sensing circuitry or a context corresponding to the area in which the device is operating.

Example 27 may include the elements of any of examples 25 to 26, and may further comprise determining the potential target objects based on data received from an external system via the communication circuitry.

Example 28 may include the elements of any of examples 19 to 27, wherein receiving the input includes interpreting natural language and generating the output includes presenting at least one of a visible or audible output based on natural language.

According to example 29 there is provided a system including at least one device, the system being arranged to perform the method of any of the above examples 19 to 28.

According to example 30 there is provided a chipset arranged to perform the method of any of the above examples 19 to 28.

According to example 31 there is provided at least one machine readable medium comprising a plurality of instructions that, in response to be being executed on a computing device, cause the computing device to carry out the method according to any of the above examples 19 to 28.

According to example 32 there is provided at least one device to perform object determination, the at least one device being arranged to perform the method of any of the above examples 19 to 28.

According to example 33 there is provided a system for object determination. The system may comprise means for initiating object determination in a device, means for receiving input from a user via user interface circuitry in the device, means for accessing memory circuitry in the device to determine if a target object identified in the input from the user is known to the device and means for causing the user interface circuitry to generate output to the user regarding whether the target object is known by the device.

Example 34 may include the elements of example 33, wherein the means for generating the output comprise means for causing the user interface circuitry to confirm the target object to the user based on a determination that the target object is known to the device or means for causing the user interface circuitry to present an inquiry to the user based on a determination that the target object is unknown to the device.

Example 35 may include the elements of example 34, wherein the means for confirming the target object to the user comprise means for at least one of presenting data regarding the target object, pointing to the target object, causing the device to move towards the target object or causing the device to obtain the target object.

Example 36 may include the elements of any of examples 34 to 35, and may further comprise means for formulating the inquiry based on a characteristic of the target object.

Example 37 may include the elements of example 36, and may further comprise means for selecting the characteristic from a group of characteristics based on the characteristic most substantially reducing a number of potential target objects.

Example 38 may include the elements of example 37, wherein if more than one potential target object is determined to exist, further comprising means for reducing the number of target objects based on input received in response to the inquiry and means for selecting another characteristic to formulate another inquiry.

Example 39 may include the elements of any of examples 37 to 38, and may further comprise means for determining the group of characteristics based on at least one of potential target object characteristics or capabilities of sensing circuitry in the device.

Example 40 may include the elements of example 39, and may further comprise means for determining the potential target objects based on at least one of scanning an area in which the device is operating with the sensing circuitry or a context corresponding to the area in which the device is operating.

Example 41 may include the elements of any of examples 39 to 40, and may further comprise means for determining the potential target objects based on data received from an external system via the communication circuitry.

Example 42 may include the elements of any of examples 33 to 41, wherein the means for receiving the input include means for interpreting natural language and generating the output includes presenting at least one of a visible or audible output based on natural language.

According to example 43 there is provided a device to be controlled by human interaction. The device may comprise user interface circuitry to receive input from a user and generate output to the user, memory circuitry to store data at least regarding objects known to the device and processing circuitry to at least receive input from the user interface circuitry, access the memory circuitry to determine if a target object identified in the input from the user is known to the device, cause the user interface circuitry to confirm the target object to the user based on a determination that the target object is known to the device, and cause the user interface circuitry to present an inquiry to the user based on a determination that the target object is unknown to the device.

According to example 44 there is provided a method for object determination. The method may comprise initiating object determination in a device, receiving input from a user via user interface circuitry in the device, accessing memory circuitry in the device to determine if a target object identified in the input from the user is known to the device, causing the user interface circuitry to confirm the target object to the user based on a determination that the target object is known to the device and causing the user interface circuitry to present an inquiry to the user based on a determination that the target object is unknown to the device.

According to example 45 there is provided at least one machine-readable storage medium. The storage medium may have stored thereon, individually or in combination, instructions for object determination that, when executed by one or more processors, cause the one or more processors to initiate object determination in a device, receive input from a user via user interface circuitry in the device, access memory circuitry in the device to determine if a target object identified in the input from the user is known to the device, cause the user interface circuitry to confirm the target object to the user based on a determination that the target object is known to the device and cause the user interface circuitry to present an inquiry to the user based on a determination that the target object is unknown to the device.

According to example 46 there is provided a system for object determination. The system may comprise means for initiating object determination in a device, means for receiving input from a user via user interface circuitry in the device, means for accessing memory circuitry in the device to determine if a target object identified in the input from the user is known to the device, means for causing the user interface circuitry to confirm the target object to the user based on a determination that the target object is known to the device and means for causing the user interface circuitry to present an inquiry to the user based on a determination that the target object is unknown to the device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device to be controlled by human interaction, comprising:
    user interface circuitry configured to receive input from a human user, the input identifying a target object and generate an output to the human user;

memory circuitry configured to store data at least regarding objects known to the device; and processing circuitry configured to at least:
receive the input from the user interface circuitry;
access the memory circuitry to determine if the target object identified in the input from the human user is known to the device; and
when it is determined that the target object is unknown to the device, the processing circuitry is further configured to:
formulate a first inquiry to said human user, wherein the first inquiry is to reduce a number of potential objects that may correspond to the target object and comprises at least a first object characteristic;
cause the user interface circuitry to present the first inquiry to said human user;
determine, in response to receipt of a reply to said first inquiry from said human user via said user interface circuitry, whether said target object is known to the device;
when it is determined that said target object is still unknown to the device following receipt of said reply to said first inquiry;
formulate a second inquiry to said human user, wherein the second inquiry is to further reduce the number of potential objects that may correspond to the target object and comprises at least a second object characteristic that is different from the first object characteristic;
cause the user interface circuitry to present the second inquiry to said human user; and
determine, in response to receipt of a reply to said second inquiry from said human user via said user interface circuitry, whether said target object is known to the device.

2. The device of claim 1, wherein the device is a robot.

3. The device of claim 1, wherein the first and second object characteristics are based on a characteristic of the target object.

4. The device of claim 3, wherein the first object characteristic, the second object characteristic, or both the first and second object characteristics is/are selected from a group of characteristics based on a characteristic most substantially reducing a number of potential target objects.

5. The device of claim 1, wherein the processing circuitry is further to:
when it is determined that more than one potential target object corresponds to the target object following receipt of the reply to the second inquiry, formulate a third inquiry to the human user, wherein the third inquiry is to further reduce the number of potential objects that correspond to the target object, and cause the user interface circuitry to present the third inquiry to the human user.

6. The device of claim 4, wherein the processing circuitry is to determine the group of characteristics based on potential target object characteristics.

7. The device of claim 6, further comprising sensing circuitry and wherein the processing circuitry is to determine the group of characteristics based on capabilities of the sensing circuitry.

8. The device of claim 6, wherein the processing circuitry is to determine the potential target objects by causing the sensing circuitry to scan an area in which the device is operating.

9. The device of claim 4, wherein the processing circuitry is to determine the potential target objects based on a context corresponding to an area in which the device is operating.

10. A method for object determination, comprising:
initiating object determination in a device;
receiving an input from a human user via user interface circuitry in the device, the input identifying a target object;
accessing memory circuitry in the device to determine if the target object identified in the input from the human user is known to the device;
when it is determined that the target object is unknown to the device, the method further comprises:
formulating, with the device, a first inquiry to the human user, wherein the first inquiry is to reduce a number of potential objects that may correspond to the target object and comprises at least a first object characteristic;
causing the user interface circuitry to present the first inquiry to the human user;
in response to receipt of a reply to the first inquiry from the human user via the user interface circuitry, determining with the device whether said target object is known to the device;
when it is determined that said target object is still unknown to the device following receipt of said reply to said first inquiry, the method further comprises:
formulating, with the device, a second inquiry to the human user, wherein the second inquiry is to further reduce the number of potential objects that may correspond to the target object and comprises at least a second object characteristic that is different from the first object characteristic;
causing the user interface circuitry to present the second inquiry to the human user; and
determining, in response to receipt of a reply to said second inquiry from said human user via the user interface circuitry, whether said target object is known to the device.

11. The method of claim 10, wherein the first and second object characteristics are based on a characteristic of the target object.

12. The method of claim 11, further comprising:
selecting, with the device the first characteristic, the second characteristic, or both the first and second characteristics from a group of characteristics based on the characteristic most substantially reducing a number of potential target objects.

13. The method of claim 9, further comprising:
when it is determined that more than one potential target object corresponds to the target object following receipt of the reply to the second inquiry, the method further comprises formulating a third inquiry to the user, wherein the third inquiry is to further reduce the number of potential objects that correspond to the target object, and causing the user interface circuitry of the device to present the third inquiry to the human user.

14. The method of claim 12, further comprising:
determining the group of characteristics based on at least one of potential target object characteristics or capabilities of sensing circuitry in the device.

15. The method of claim 14, further comprising:
determining the potential target objects based on at least one of scanning an area in which the device is operating with the sensing circuitry or a context corresponding to the area in which the device is operating.

16. At least one non-transitory machine-readable storage medium having stored thereon, individually or in combination, instructions for object determination that, when executed by one or more processors, cause the one or more processors to perform the following operations comprising:
initiating object determination in a device;
receiving input from a human user via user interface circuitry in the device, the input identifying a target object;
accessing memory circuitry in the device to determine if the target object identified in the input from the human user is known to the device;
when it is determined that the target object is unknown to the device, the instructions when executed further cause the one or more processors to perform the following operations comprising:
formulating, with the device, a first inquiry to the human user, wherein the first inquiry is to reduce a number of potential objects that may correspond to the target object and comprises at least a first object characteristic;
causing the user interface circuitry of the device to present the first inquiry to the human user;
in response to receipt of a reply to the first inquiry from the human user via the user interface circuitry, determining with the device whether said target object is known to the device;
when it is determined that said target object is still unknown to the device following receipt of said reply to said first inquiry:
formulating a second inquiry to the human user with the device, wherein the second inquiry is to further reduce the number of potential objects that may correspond to the target object and comprises at least a second object characteristic that is different from the first object characteristic;
causing the user interface circuitry to present the second inquiry to the human user; and
determining, in response to receipt of a reply to said second inquiry from said human user via the user interface circuitry, whether said target object is known to the device.

17. The non-transitory storage medium of claim 16, wherein the first and second object characteristics are based on a characteristic of the target object.

18. The non-transitory storage medium of claim 17, further comprising instructions that, when executed by one or more processors, cause the one or more processors to perform the following additional operations comprising:
Selecting the first characteristic, the second characteristic, or both the first and second characteristics from a group of characteristics based on the characteristic most substantially reducing a number of potential target objects.

19. The non-transitory storage medium of claim 16, wherein said instructions when executed by said one or more processors cause the one or more processors to perform the following additional operations comprising:
when it is determined that more than one potential target object corresponds to the target object following receipt of the reply to the second inquiry, formulating a third inquiry to the human user, wherein the third inquiry is to further reduce the number of potential objects that correspond to the target object, and causing the user interface circuitry of the device to present the third inquiry to the human user.

20. The non-transitory storage medium of claim 18, further comprising instructions that, when executed by one or more processors, cause the one or more processors to perform the following operations comprising:
determining the group of characteristics based on at least one of potential target object characteristics or capabilities of sensing circuitry in the device.

21. The non-transitory storage medium of claim 20, further comprising instructions that, when executed by one or more processors, cause the one or more processors to perform the following operations comprising:
determining the potential target objects based on at least one of scanning an area in which the device is operating with the sensing circuitry or a context corresponding to the area in which the device is operating.

* * * * *